Figure 1:
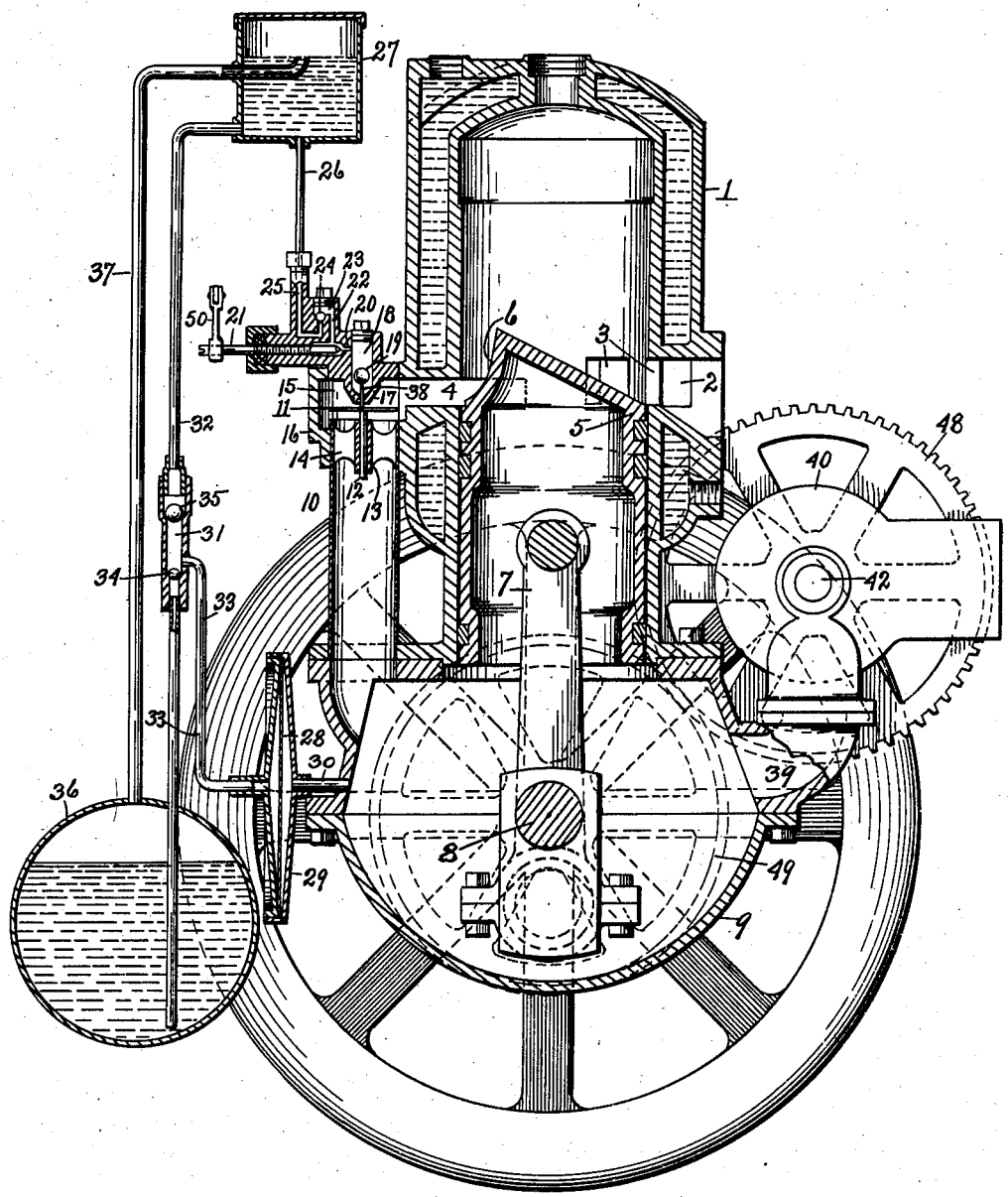

G. A. TROUTT.
INTERNAL COMBUSTION ENGINE.
APPLICATION FILED FEB. 10, 1910.

1,022,803.

Patented Apr. 9, 1912.

2 SHEETS—SHEET 1.

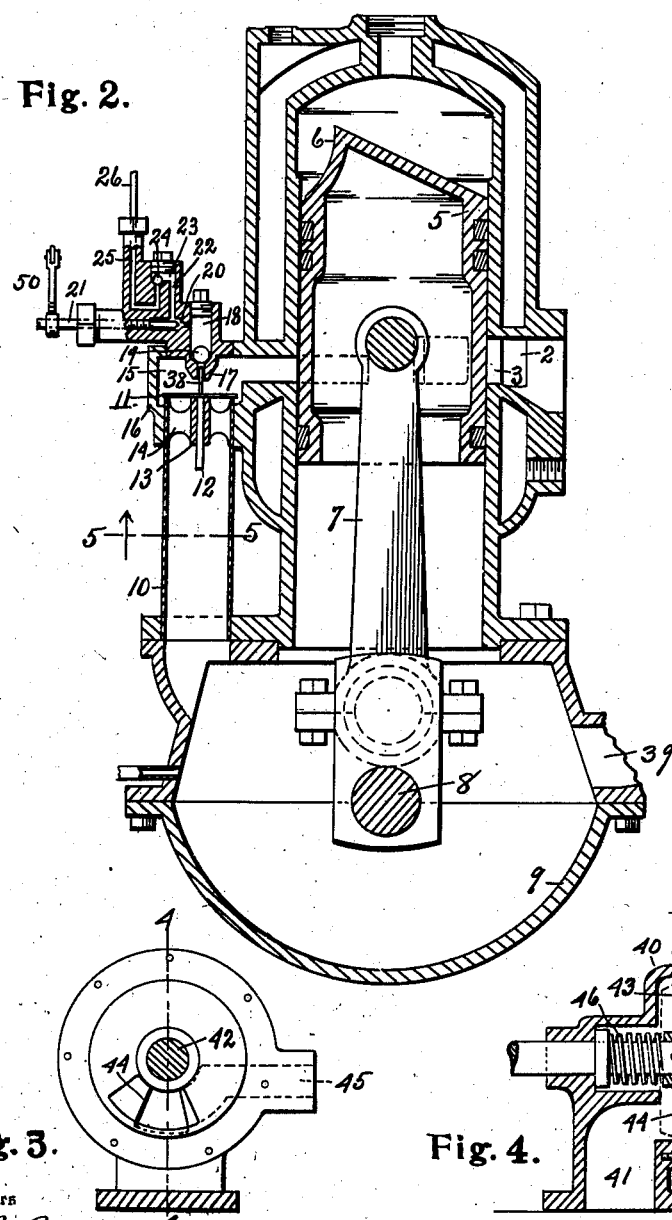
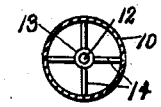
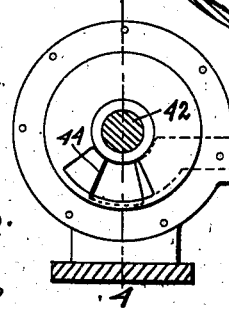
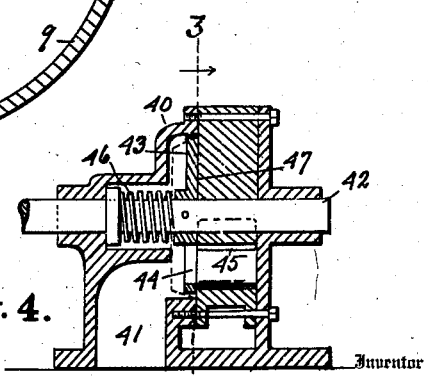

UNITED STATES PATENT OFFICE.

GEORGE A. TROUTT, OF DETROIT, MICHIGAN.

INTERNAL-COMBUSTION ENGINE.

1,022,803.  Specification of Letters Patent.  Patented Apr. 9, 1912.

Application filed February 10, 1910. Serial No. 543,023.

*To all whom it may concern:*

Be it known that I, GEORGE A. TROUTT, a citizen of the United States, residing at Detroit, in the county of Wayne, State of Michigan, have invented certain new and useful Improvements in Internal-Combustion Engines; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to internal combustion engines of the two cycle type, and consists in the construction and arrangement of parts hereinafter more fully set forth and pointed out particularly in the claim.

The object of the invention is to produce an internal combustion engine of the type described, wherein the arrangement is such as to maintain a constant volume of air so as to supply the cylinder at all speeds with a sufficient charge of air to sweep out the burned gases, the speed of the engine being controlled by regulating the feed of the gasolene to produce a powerful mixture or a weak mixture, as may be desired, provision being also made for obviating flooding and the consequent feeding of an excessively rich charge into the cylinder by preventing the accumulation of gasolene in the engine base, and for supplying a priming quantity of gasolene which shall be available at the starting of the engine to insure the conveying of a sufficient quantity of fuel into the cylinder to cause an explosion when the temperature is low and the parts are cold.

The above object is attained by the structure illustrated in the accompanying drawings, in which:—

Figure 1 is a vertical sectional view through an engine embodying my invention, showing the position of the piston after the explosion of a charge when the cylinder is exhausting the burned gases and is receiving a charge for a succeeding explosion. Fig. 2 is a similar view with some of the parts omitted, showing the position of the piston at the limit of the compression stroke. Fig. 3 is a sectional view through the shaft of the apparatus controlling the air intake, as on line 3—3 of Fig. 4. Fig. 4 is a sectional view as on line 4—4 of Fig. 3. Fig. 5 is a transverse section through the air pipe connecting the engine base with the cylinder, as on line 5—5 of Fig. 2.

Referring to the characters of reference, 1 designates the cylinder which is of the water-cooled type, having the usual exhaust port 2 communicating with the interior of the cylinder through the openings 3 in the wall thereof, and having the usual intake port 4. It will be noted that the openings leading to the discharge port are above the plane of the intake port, whereby the burned gases may start to leave the cylinder before the intake port is uncovered by the downward stroke of the piston 5. The shape of the piston at its upper end is such as to form an upwardly curved wall 6, which, when the piston is at the limit of its downward stroke, stands opposed to the intake opening, whereby the new charge which is forced into the cylinder is directed upwardly and away from the exhaust port openings, the force of said incoming charge when so directed, serving to assist in sweeping the burned gases from the cylinder, thus heightening the scavenging qualities of the engine.

Connected to the piston at its upper end in the usual manner is the connecting rod 7, the lower end of said rod being connected to the crank shaft 8 in a manner common in the art, said shaft passing through the hollow engine base 9 in which is compressed the air which is admitted to the cylinder through the intake port with its accompaniment of gasolene vapor to form the successive explosive charges, as hereinafter more fully explained.

Connecting the hollow base 9 with the intake port 4 is a vertical air tube 10 of relatively large diameter, the upper end of which is closed by a check valve 11 having a depending stem 12 adapted to reciprocate in a centrally disposed guide 13 supported from the wall of said tube by the radial arms 14. The valve 11 is confined within a chamber 15 formed in a fitting 16 embracing the upper end of the tube 10, said chamber opening into the intake port 4. Depending into the chamber 15 centrally over the valve 11 is a gasolene feed nozzle 17 having an opening therethrough which communicates with the gasolene feed chamber 18 having therein a ball valve 19 for normally closing the opening through said nozzle.

Gasolene is admitted to the chamber 18 near its upper end through a port 20 controlled by a needle valve 21. Gasolene is supplied to the port 20 controlled by said needle valve through a vertical passage 22 leading downward from the valve chamber 23 in which is located a second ball valve 24 adapted to seat over the upper end of the passage 25 leading to said chamber to prevent a backward escape of pressure through said passage. Connected with the passage 25 is a vertical supply pipe 26 leading from the elevated fuel reservoir 27, as shown in Fig. 1, wherein is maintained a constant level of gasolene, or other hydrocarbon fuel. Any suitable means may be employed for maintaining a constant level in the reservoir 27; the means which I have illustrated herein comprising a diaphragm valve 28 located in a suitable casing 29, one side of said valve communicating with the interior of the engine base through the pipe 30, the other side of said valve communicating with the chamber 31 of the stand pipe 32 through the connecting pipe 33, the upper end of which enters said chamber between the ball check valves 34 and 35. The lower end of the pipe 32 enters the supply tank 36 and the upper end of said pipe enters the reservoir 27 at the bottom. An overflow pipe 37 connects said reservoir with said supply tank. It will now be understood that as the air is successively compressed in the base of the engine, the diaphragm 28 will be actuated to force the gasolene upwardly from the chamber 31 through the pipe 32 into said reservoir, the ball valve 34 preventing a backward flow of the gasolene from said chamber into the supply tank and the ball valve 35 preventing a backward flow of gasolene from the reservoir.

Projecting upwardly from the valve 11 at the upper end of the air pipe 10 is a pin 38 which passes loosely through the opening in the nozzle 17 and which when the valve 11 is lifted, will engage the ball valve 19 and lift it from its seat over the opening through said nozzle to permit a flow of gasolene from the nozzle onto the flat upper face of the valve 11.

In this engine gasolene vapor is not drawn into the base of the engine and compressed therein; atmospheric air only being admitted to said base through the intake port 39.
To provide for intermittently opening and closing said port to permit the air to be periodically drawn into said base and prevent the escape of air therethrough at the time of compression, there is provided a case 40 having an air passage 41 therein which communicates with the port 39. Journaled in and passing through the case is a shaft 42. Mounted on said shaft to rotate therewith is a disk 43 having an opening 44 therethrough adapted to establish communication at predetermined periods during the rotation of said disk between the air passage 41 and the air intake opening 45 leading into said case between which passage and opening said disk revolves. The disk 43 is so keyed to the shaft 42 as to permit of a sliding movement of the disk upon said shaft. Embracing the shaft 42 and bearing with pressure against the disk 43 is a spring 46 which forces said disk against the face of the wall 47 within the case to effect a tight closure between said parts and prevent the escape of air at the moment of compression within the base. Upon the shaft 42 is a gear wheel 48 which meshes with a gear wheel 49, shown by dotted lines in Fig. 1, mounted on the shaft 8 of the engine. These parts are so timed in their operation that during the upward stroke of the piston, the opening 44 in the disk 43 will be caused to register with the air opening 45 and the air passage 41, as shown in Fig. 4, thereby permitting air to enter and fill the engine base. The continued rotation of the disk 43 will carry the solid portion thereof over the opening 45 leading into the passage 41 so that upon the descent of the piston, the air which occupies the base 9 will be compressed therein and forced upwardly through the air pipe 10. The pressure of the compressed air within the pipe 10 will lift the valve 11 at the upper end of said pipe, permitting the air to flow by said valve and through the intake port 4 when the downward movement of the piston shall have been sufficient to uncover said port. The lifting of the valve 11 will raise the ball valve 19 from its seat and permit a flow of gasolene from the nozzle 17 onto the upper face of the valve 11 on which the gasolene will spread so as to flow over the edge thereof. The rapid flow of air past said valve will take up the gasolene and commingle it therewith so as to cause the air and gasolene to enter the cylinder through the port 4 in the form of an explosive mixture. When the piston 5 shall have reached the limit of its downward movement, the pressure in the base and in the air tube or by-pass 10 will cease, permitting the valve 11 to drop to its seat and allowing the ball valve 19 to close the opening through the nozzle 17, allowing a succeeding charge of gasolene to accumulate in the chamber 18 above said ball valve for a succeeding operation.

By means of this construction the accumulation of gasolene in the base of the engine is obviated because of the fact that the gasolene is fed onto the upper flat surface of the valve 11 and the further fact that any gasolene which might overflow said valve will be taken up and vaporized by the rapid upward passage of air through the tube 10 before it can reach the engine base. It will further be noted that by means of this arrangement a full charge of air is drawn into the base and forced therefrom into the cylinder at each revolution, the quantity of air being the same under all conditions. This insures the admittance of a full charge of air into the cylinder after each explosion which materially assists in sweeping the burned gases therefrom. Under these conditions where the volume of the air charge remains constant, the speed of the engine is controlled by decreasing or increasing the gasolene supply to vary the strength of the explosive mixture. To control the feed of gasolene, the needle valve 21 may be actuated through the medium of an arm 50 thereon which may be operated manually in any suitable manner.

Having thus fully set forth my invention, what I claim as new and desire to secure by Letters Patent, is:—

An internal combustion engine, comprising a cylinder, a piston, a hollow base, said cylinder having intake and exhaust ports adapted to be opened and closed by the travel of the piston, an air passage connecting the hollow base with the cylinder through the intake port, an air valve in the upper end of said air passage, a gasolene feed chamber above said air valve for holding a measured quantity of gasolene, a gasolene feed nozzle communicating with said chamber and depending into said air passage adjacent said intake port, a valve for closing the opening between said chamber and nozzle, a source of gasolene supply, a pipe connecting said source of supply with said feed chamber, a valve for regulating the flow of fuel to said chamber, a check valve in said pipe leading from the source of gasolene supply to prevent the pressure in the air passage during the period of compression from forcing the gasolene out of said feed chamber in advance of the opening of said air valve, and means operatively associated with said air valve for actuating the valve in said feed chamber to discharge the contents of said chamber onto the lifted air valve.

In testimony whereof, I sign this specification in the presence of two witnesses.

GEORGE A. TROUTT.

Witnesses:
I. G. HOWLETT,
O. B. BAENZIGER.